3,502,484
ANTIOXIDANT SALT

Richard Kolasinski, Richmond, Mich., assignor to Diamond Crystal Salt Company, St. Clair, Mich., a corporation of Michigan
No Drawing. Filed Apr. 10, 1967, Ser. No. 629,380
Int. Cl. A23l 1/22
U.S. Cl. 99—143                             2 Claims

ABSTRACT OF THE DISCLOSURE

A finely powdered butylated hydroxyanisole (BHA)-diluent mixture is prepared by melting the BHA by heating, intermixing the melted BHA with the diluent material, cooling to produce a friable mixture, particulating the friable mixture into finely divided particles and separating the particles to a size less than 100 mesh.

BACKGROUND OF THE INVENTION

This invention broadly relates to a microsized antioxidant salt composition and a microsized powdered BHA-diluent antioxidant composition for use with salt.

The use of antioxidants to prevent the development of rancidity in fat-containing products is well known. In many cases these products contain both antioxidants and salt, and it has been found convenient to use the salt as a carrier for the antioxidants with the usual procedure being to dissolve the antioxidants in a solvent such as propylene glycol and then to blend the resultant solution with the salt. In the past the above procedure has been found quite satisfactory with the normal grades of salts found on the market, that is to say, with salt composed of particles substantially between 14 and about 100 mesh Tyler screen size, but it has been found unsatisfactory when the salt is substantially finer than 100 mesh Tyler. It has long been felt that a very fine antioxidant salt, namely, one of less than 100 mesh Tyler particle size, if available, could advantageously be used for the manufacture of a product such as peanut butter, and it is for this reason that a method for making such a salt product has been considered highly desirable.

One alternate procedure would be to dry blend the finely powdered dry antioxidants with the salt. This is possible with three of the ingredients presently composing the most common antioxidant mixtures. These three, namely, propyl gallate, butylated hydroxytoluene (BHT), and citric acid are available commercially in a finely powdered grade and present no problems in a dry blending operation. However, the fourth ingredient of many present antioxidant formulas, namely BHA, is available in the form of waxy flakes of a rather low melting range, 48–55° C. These flakes are too coarse to blend uniformly with a very fine salt since the amount of the antioxidant required is quite small in relation to the total salt composition and, because of their low melting range and waxy constitution the flakes cannot be ground commercially to a fine powder and stored without agglomerating.

Accordingly, one object of the present invention is to provide an impoved antioxidant composition suitable for use with salt having a particle size less than 100 mesh Tyler screen size.

Another object of the present invention is to provide an improved antioxidant composition comprised of a finely powdered mixture of butylated hydroxyanisole and a diluent material, said mixture being in particulate form and having a size of less than 100 mesh Tyler screen size.

Another object of the present invention is to provide an improved salt composition in particulate form of less than 100 mesh Tyler screen size and containing a finely powdered mixture of butylated hydroxyanisole and a diluent material.

Another object of the present invention is to provide a process of preparing the improved antioxidant composition disclosed herein.

Still another object of the present invention is to provide the process of preparing the antioxidant salt compositions disclosed herein.

Other objects, features and advantages of the present invention will become apparent from the subsequent description and the appended claims.

SUMMARY OF THE INVENTION

The above and related objects can be fulfilled due to the unexpected discovery that a finely powdered BHA having good storage and flow properties can be prepared by melting the BHA and then blending in a quantity of finely powdered diluent material, such as, tricalcium phosphate, sodium aluminum silicate, or −325 mesh salt. The blending is continued while the material cools, and the resultant mixture is then reduced to the required particle size using any of the methods conventionally available for such a purpose.

This finely powdered BHA-diluent mixture has been found to be surprisingly suitable for dry blending with fine salt of less than 100 mesh particle size, and it is also compatible with the other antioxidant ingredients presently available in powdered form. A finely powdered BHA-diluent mixture of this type can also be used to prepare a salt water suspension of BHA such as discussed in the article by L. H. Henthorn in the February 1967 issue of "Cereal Science Today" at pages 49–50.

Moreover, it can be of use for incorporation in other salt products where the use of a solvent carrier such as propylene glycol is undesirable.

Still further, a dry powdered BHA-diluent mixture of this type permits the blending of dry antioxidants with cold salt at room temperature, whereas heretofore this has not been possible due to occurrence of "shot balls".

Suitable applications for a microsized antioxidant composition and the salt product produced therewith in accordance with this disclosure would be, for example, in salted nuts, dry cereals, peanut butter, and peanut flour.

DESCRIPTION OF PREFERRED EMBODIMENTS

In accordance with the invention described herein, a finely powdered BHA-diluent mixture can satisfactorily be prepared by first melting the BHA and then incorporating a quantity of finely powdered diluent material such as, for example, tricalcium phosphate into the molten BHA, then cooling and powdering the friable mixture before screening it to the desired particle size. This finely powdered BHA-diluent mixture can then be dry blended with very fine salt and other antioxidant ingredients presently available in powdered form which are desired to be used in the salt composition.

The particle size of the salt product to which the invention herein is applicable is that salt which has a particle size of less than 100 mesh Tyler screen size.

The diluent material used in the antioxidant composition may suitably be from the following group: tricalcium phosphate (TCP), sodium aluminum silicate (Zeolex), finely powdered salt of less than 325 mesh size (i.e., −325 mesh salt), calcium silicate, silicon dioxide, or magnesium carbonate. Other materials could be used as the diluent so long as the material possessed a particle size as stated hereinbelow and a high bulk absorptivity. In addition, the diluent material could be any one of those previously mentioned or a mixture of two or more thereof. The particle size of the diluent material should be less than 100 mesh Tyler screen size.

The amount of diluent material required varies depending on its particle size and bulk absorptivity and on the anticipated time during which the BHA-diluent mixture will be stored before incorporating it in the bulk of the fine salt. For example, a satisfactory antioxidant composition has been prepared and stored for six months without caking by using either TCP or Zeolex at the 50% level. However, when microsized salt of approximately 325 mesh size or smaller is used as a diluent a higher amount of the diluent based on its admixture with the BHA is required. For example, the microsized salt was used at a level of about 66⅔% by weight based on the total of diluent and BHA. Broadly stated, the amount of diluent material used should be at least about 5% by weight based on the total of BHA and diluent in the antioxidant composition. The upper limit of diluent material used is not critical, yet generally stated it does not exceed approximately 98%.

The BHA particle size, broadly stated, should be less than 100 mesh Tyler screen size. The amount of the BHA used in the antioxidant composition will generally make up the balance of the composition over the amount of diluent material used which, as previously stated, is present in an amount of at least 5% by weight or more of the antioxidant composition.

The finely powdered BHA-diluent mixture in accordance with this invention can be used alone as an antioxidant composition or in conjunction with other powdered antioxidants such as butylated hydroxytoluene, propyl gallate, citric acid and the like. The finely powdered BHA-diluent mixture can satisfactorily be blended with microsized salt, and other powdered antioxidant ingredients if they are used, to thereby produce a free flowing fine antioxidant salt composition in particulate form having a size less than 100 mesh Tyler.

The amount of the finely powdered BHA-diluent mixture blended into the microsized salt to form an antioxidant salt composition is not critical to the practice of this invention. Generally, the amount of said mixture to be used will be less than 2% by weight of the salt and not in excess of about 5%. The total amount of antioxidant composition used with the salt, of course, depends on the final application for which the salt product is intended, and those skilled in the art are aware of the actual amounts of antioxidants required for various applications to which the salt product is to be put. Moreover, those skilled in the art are aware that governmental regulations constitute to a large extent the criteria which determine the amount of antioxidant composition which should be used in any given salt product and since the amount allowed varies with the application, no attempt will be made herein to set a definite limit as to the amount of antioxidant composition allowable in conjunction with a finalized salt product.

As used herein, the terminology that particles have a particular size as described by a particular size mesh Tyler screen, it is intended to mean that those particles are all of such size such that they will pass through the particular screen size designated in a screening operation as conventionally recognized in the art, whereas particles larger than said particular screen size will be retained on the screen and hence may be considered of a size larger than the screen opening.

By the term microsized as used herein it is meant particles of such a size that they would not be held up on a 100 mesh Tyler screen.

In order to further illustrate the invention, the following examples are provided. It is to be understood, however, that the examples are included for illustrative purposes, and are not intended to be limiting of the scope of the invention as set forth in the subjoined claims.

EXAMPLE 1

Fifty parts BHA was first melted by heating it to a temperature above its melting range of 48–55° C. After the BHA was in a molten state there was incorporated therein 50 parts of finely powdered tricalcium phosphate (TCP) diluent material having a size of less than 100 mesh. The mixture was then allowed to cool to approximately room temperature to thereby produce a friable mixture which was then powdered and subjected to a screening operation to produce a finely powdered BHA-tricalcium phosphate mixture having a particle size of less than 100 mesh. It was found that this finely powdered BHA-TCP mixture could be dry blended with very fine salt having a particle size of less than 100 mesh and that other antioxidant ingredients could be readily incorporated in the blending operation with the fine salt.

In order to test this BHA-TCP antioxidant composition it was blended with a microsized salt having a particle size of less than 100 mesh Tyler screen size. In addition, the additional antioxidant ingredients of propyl gallate and citric acid were blended into the salt composition, and all materials were blended together using a twinshell blender. The proportion of ingredients blended together to form the final salt composition was as follows:

| | Percent |
|---|---|
| Microsize salt including 1.5% TCP | 99.6700 |
| BHA-TCP mixture (50% BHA, 50% TCP) | 0.2550 |
| Propyl gallate | 0.0475 |
| Citric acid | 0.0275 |
| | 100.0000 |

No problems were encountered in blending this mix as set forth in the above formulation.

EXAMPLE 2

The procedure of Example 1 is repeated except that 50 parts by weight of Zeolex 23 diluent material is used with 50 parts by weight of BHA instead of the tricalcium phosphate diluent material of Example 1.

EXAMPLE 3

The procedure of Example 1 is repeated except that 66⅔ parts by weight of microsized fine salt is used as the diluent material and having a particle size of less than approximately 325 mesh. This microsized salt is used as the diluent material, in place of the tricalcium phosphate of Example 1, with 33⅓ parts of weight of BHA to form the finely powdered BHA-diluent antioxidant composition.

EXAMPLE 4

An antioxidant composition as follows was prepared using the procedure of Example 1:

| | Parts by wt. |
|---|---|
| BHA | 90 |
| Cab-O-Sil M5 | 10 |

Cab-O-Sil M5 is a pyrogenic silica (SiO$_2$) manufactured by Cabot Corp. of Boston, Mass.

EXAMPLE 5

An antioxidant composition as follows was prepared using the procedure of Example 1:

| | Parts by wt. |
|---|---|
| BHA | 95 |
| Cab-O-Sil M5 | 5 |

EXAMPLE 6

An antioxidant composition as follows was prepared using the procedure of Example 1:

| | Parts by wt. |
|---|---|
| BHA | 80 |
| Zeolex-23 | 20 |

Zeolex-23 is sodium aluminum silicate manufactured by J. M. Huber Corp. of 630 3rd Ave., New York, N.Y.

EXAMPLE 7

An antioxidant composition as follows was prepared using the procedure of Example 1:

| | Parts by wt. |
|---|---|
| BHA | 90 |
| Zeolex-23 | 10 |

In accordance with the herein described invention an alternative embodiment for preparing the BHA-diluent mixture which has been found satisfactory is to incorporate the diluent in a solution of the BHA dissolved in a solvent such as methyl alcohol or ethyl alcohol. After the diluent has been mixed with this solution the solvent is removed for example, by the use of reduced pressure, then the resulting dry mixture of BHA and diluent is screened to give a particle size of less than 100 mesh.

The solvent used as described above may satisfactorily be either methyl alcohol, ethyl alcohol or mixtures thereof, however, the particular solvent chosen is not critical and those skilled in the art will realize that other solvents could satisfactorily be used in addition to those referred to here. In a commercial process where the BHA-diluent mixture resulting therefrom was to be incorporated in a food product, ethyl alcohol would be a suitable selection as a solvent from the standpoint that it would be non-deleterious to human consumption should any trace amounts of the solvent remain in the mixture.

EXAMPLE 8

An antioxidant composition comprised of 50 parts by weight BHA and 50 parts by weight of Zeolex 23 was prepared by first dissolving the BHA in an excess of methyl alcohol solvent. The Zeolex 23 was then added to the solution of BHA and methyl alcohol and thoroughly mixed. The methyl alcohol was then evaporated by placing the solution under reduced pressure, thereby leaving a dry mixture of the BHA and Zeolex-23. This mixture was pulverized and screened to a particle size of less than 100 mesh.

What is claimed is:

1. A method of preparing an antioxidant composition consisting essentially of:
    (a) about 5% to about 98% by weight of a finely divided diluent material having an effective particle size of less than 100 mesh, and wherein said diluent material is selected from the group consisting of tricalcium phosphate, sodium aluminum silicate, minus 325 mesh salt, silicon dioxide, calcium silicate, magnesium carbonate, and mixtures thereof,
    (b) a balance of butylated hydroxyanisole having an effective particle size of less than 100 mesh, said diluent material being operable to bring about the solidification of melted BHA into a friable mixture capable of being separated into finely divided particles of size less than 100 mesh, said method comprising the steps of:
        (1) melting the butylated hydroxyanisole by heating,
        (2) intermixing the melted butylated hydroxyanisole with the diluent material to form a mixture,
        (3) cooling to produce a friable mixture and particulating the friable mixture into finely divided particles, and
        (4) separating the particles to a size of less than 100 mesh.

2. A method of preparing an antioxidant composition-containing product, said composition consisting essentially of:
    (a) about 5% to about 98% by weight of a finely divided diluent material having a particle size of less than 100 mesh, and said diluent material being selected from the group consisting of tricalcium phosphate, sodium aluminum silicate, minus 325 mesh salt, silicon dioxide, calcium silicate, magnesium carbonate, and mixtures thereof,
    (b) and a balance of butylated hydroxyanisole having an effective particle size of less than 100 mesh, said method comprising the steps of:
        (1) melting the butylated hydroxyanisole by heating,
        (2) intermixing the melted butylated hydroxyanisole with the diluent material to form a mixture,
        (3) cooling to produce a friable mixture and particulating the friable mixture into finely divided particles,
        (4) separating the particles to a size less than 100 mesh, and
        (5) adding the intermixed particles to said product in an effective amount to act as an antioxidant therein.

References Cited

UNITED STATES PATENTS

| 2,645,581 | 7/1953 | Robison | 99—143 |
| 3,008,832 | 11/1961 | Gorsica | 99—143 X |
| 3,406,077 | 10/1968 | Irani | 99—143 |

A. LOUIS MONACELL, Primary Examiner

D. M. NAFF, Assistant Examiner

U.S. Cl. X.R.

99—150; 252—404